US007752400B1

(12) United States Patent
Young

(10) Patent No.: US 7,752,400 B1
(45) Date of Patent: Jul. 6, 2010

(54) ARBITRATION AND CROSSBAR DEVICE AND METHOD

(75) Inventor: Mark S. Young, Mountain View, CA (US)

(73) Assignee: F5 Networks, Inc., Seattle, WA (US)

( * ) Notice: Subject to any disclaimer, the term of this patent is extended or adjusted under 35 U.S.C. 154(b) by 2431 days.

(21) Appl. No.: 09/738,003

(22) Filed: Dec. 14, 2000

(51) Int. Cl.
*G06F 13/18* (2006.01)

(52) U.S. Cl. .................. 711/158; 711/E12.05

(58) Field of Classification Search .......... 711/158, 711/150, 151; 710/113, 116, 117, 114, 111, 710/309, 316–317, 240–241, 244
See application file for complete search history.

(56) References Cited

U.S. PATENT DOCUMENTS

| | | | | |
|---|---|---|---|---|
| 5,515,523 A | * | 5/1996 | Kalkunte et al. | 710/240 |
| 5,557,755 A | * | 9/1996 | Krein et al. | 710/113 |
| 5,560,016 A | * | 9/1996 | Fiebrich et al. | 710/240 |
| 5,617,545 A | | 4/1997 | Ogata et al. | 710/116 |
| 5,754,800 A | * | 5/1998 | Lentz et al. | 710/116 |
| 5,996,037 A | * | 11/1999 | Emnett | 710/117 |
| 6,026,459 A | | 2/2000 | Huppenthal | 710/116 |
| 6,038,630 A | * | 3/2000 | Foster et al. | 710/317 |
| 6,073,199 A | * | 6/2000 | Cohen et al. | 710/113 |
| 6,185,647 B1 | * | 2/2001 | Shibuya | 710/116 |
| 6,226,702 B1 | * | 5/2001 | Yakashiro | 710/241 |
| 6,324,616 B2 | * | 11/2001 | Chrysos et al. | 710/244 |
| 6,363,445 B1 | * | 3/2002 | Jeddeloh | 710/113 |
| 6,499,090 B1 | * | 12/2002 | Hill et al. | 711/158 |
| 6,513,082 B1 | * | 1/2003 | Fischer et al. | 710/113 |

OTHER PUBLICATIONS

Inoue, M; Morikawa, H, Hatori, M; Mizumachi, M; Resource Allocation Schemes for Non-Real-Time Bursty Traffic in Wireless ATM Networks; Nov. 18-22, 1996; Global Telecommunications Conference 1996; vol. 3, pp. 1984-1990.*

* cited by examiner

*Primary Examiner*—Reginald G Bragdon
*Assistant Examiner*—Eric Loonan
(74) *Attorney, Agent, or Firm*—Nixon Peabody LLP

(57) ABSTRACT

Disclosed is a method and apparatus for crossbar arbitration. In one embodiment, the crossbar arbitration includes a memory, a plurality of functional units that transfer data to and from the memory, a crossbar unit that provides a data path from each unit to the memory, and an arbitration unit that monitors data traffic generated by each functional unit through the crossbar unit and assigns a priority to each functional unit based on the data traffic. In another embodiment, the crossbar arbitration includes a method for data transfer arbitration including monitoring data transfers for a plurality of devices, and assigning a priority to each device corresponding to the amount of data transfers generated by the device.

16 Claims, 10 Drawing Sheets

ARBITRATION AND CROSSBAR DEVICE AND METHOD

FIELD OF THE INVENTION

The invention relates generally to data transfer, and more particularly, to an arbitration device and method for assigning data transfer priorities to a plurality of devices.

BACKGROUND OF THE INVENTION

A computer system includes several components, such as a central processing unit (CPU) and communications devices that transfer data to and from memory. A priority may be assigned to each device in the computer system, so that if two or more devices attempt to access the memory at the same time, the device with the higher priority is able to access the memory first. Typically, the priority system that is used to resolve data transfer conflicts is based on a set of assumptions. For example, an internet port may have a history of generating a large amount of data transfer requests, where the amount of data that is transferred is very large. The CPU may have a history of being idle for long periods of time, followed by generating a data transfer request for a small amount of data. In this case, the data transfer request from the CPU will be given a higher priority, because the time required for the data transfer to or from the CPU will be very small. However, these assumptions may change. Thus, the problem with the prior art methods for arbitration of data transfer requests is that the priorities used in the arbitration are fixed, and are thus inefficient when the assumptions underlying the priorities change.

SUMMARY OF THE INVENTION

In one embodiment, an apparatus includes a memory, multiple functional units that transfer data to and from the memory, a crossbar unit that provides a data path from each unit to the memory, and an arbitration unit that monitors data traffic generated by each functional unit through the crossbar unit and assigns a priority to each functional unit based on the data traffic.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
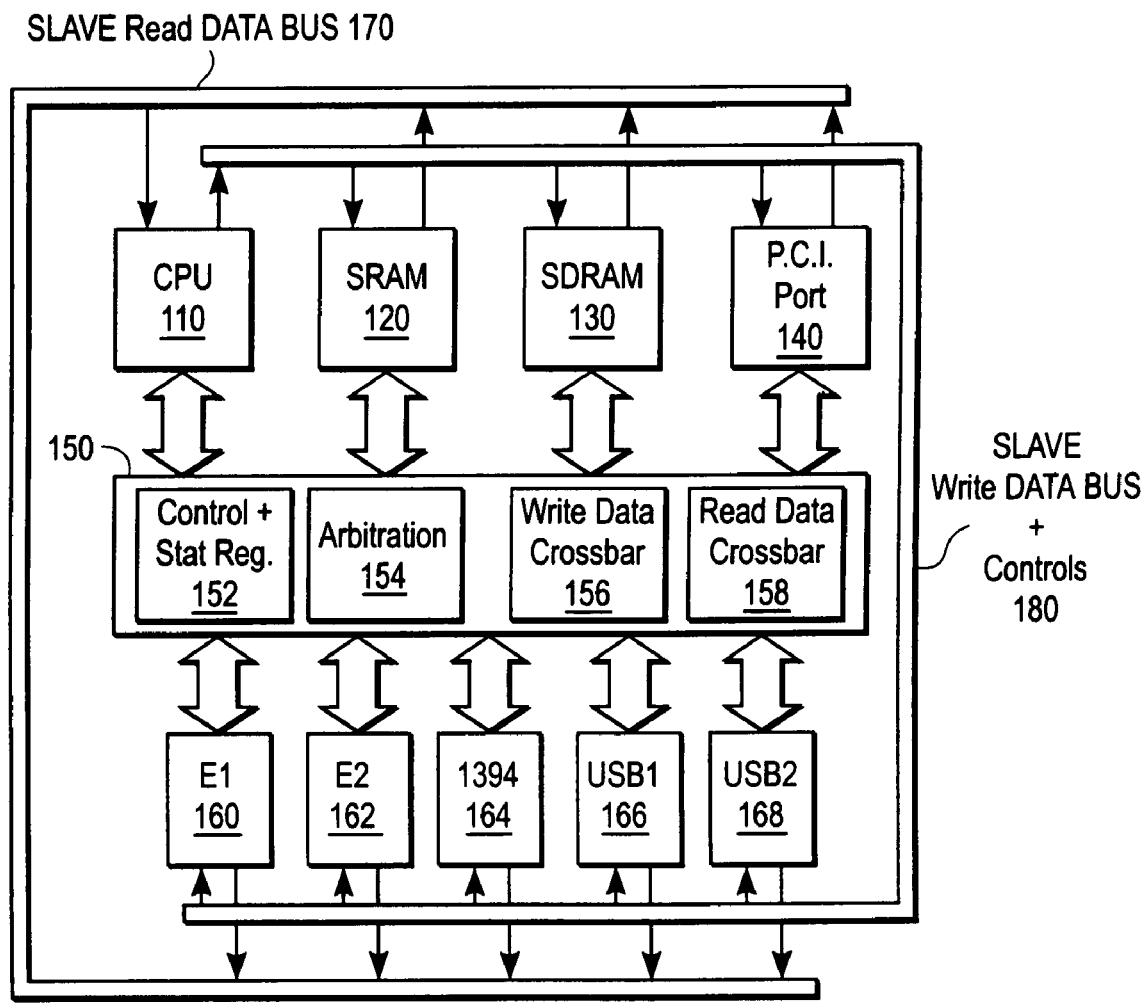
FIG. 1 shows an embodiment of a crossbar and arbitration device.

A crossbar is described. In the following description, numerous details are set forth to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

A method for data transfer arbitration is described. In one embodiment, this methodology includes monitoring data transfers through a crossbar and assigning a priority to each device corresponding to the amount of data transfers generated by the device. An arbitration unit monitors the data traffic through the crossbar. The monitoring may include monitoring the type of data that is being transferred. The arbitration unit employs an arbitration algorithm and is programmable such that it allows access priorities to memory to be programmably defined. In one embodiment, the arbitration unit examines the different channels at regular intervals to determine whether any adjustments need to be made. In one embodiment, the arbitration unit uses statistics registers to count the number of data transfers through the crossbar. Statistic registers provide an indication by which the arbitration unit can dynamically adjust the priorities assigned to devices based on the bandwidth demand requested by each device.

In one embodiment, the statistic registers store the number of times a particular requester makes requests and the type of data that the requester sends. Thus, these registers provide a running statistical time interval. Note that the time interval may be programmable based on how large the statistic registers are. In one embodiment, the only data that is counted is the data that actually moves through the crossbar. Therefore, transactions that may start, yet do not complete, are not included in the statistics that are maintained for each unit.

Thus, through the use of techniques described herein, the arbitration methodology is programmable to make changes based on the specific utilization of the bus by functional units.

System Overview

FIG. 1 illustrates system 100 that comprises a crossbar and interconnect for interfacing set of networking and CPU cores. Referring to FIG. 1, central (address/data) crossbar 150 links other components together. A purpose of the crossbar 150 is to allow the various functional units to access the two memory resources, SRAM 120 and SDRAM 130, in the system, as well as a flash memory (not shown). Note that crossbar 150 may provide an interface to other devices besides memory, such as, for example, another crossbar. To handle contention between the different units, centralized arbitration regulates the requests relative to the available memory resources.

In one embodiment, all cores in system 100 communicate through memory. In such a case, there is no direct DMA to DMA transfers allowed, and only CPU 110 is allowed to communicate with other units besides memory. In one embodiment, CPU 110 accesses other units via a slave register access bus that is independent of the DMA data port.

In one embodiment, crossbar 150 comprises at least three related, but loosely coupled units: arbitration unit 154, write data crossbar 156, and read data crossbar 158. Arbitration unit 154 allocates the memory resources between the various requesting units. Write data crossbar 156 and read data crossbar 158 are responsible for moving the data associated with the requests to and from memory controllers for each of the memories. In one embodiment, the units in system 100 that are capable of independently accessing the memory are Ethernet MAC cores 160 and 162, 1394 Link core 164, USB (Host) 166, USB (Slave) 168, CPU 110, and PCI Controller 140.

Figure 2:
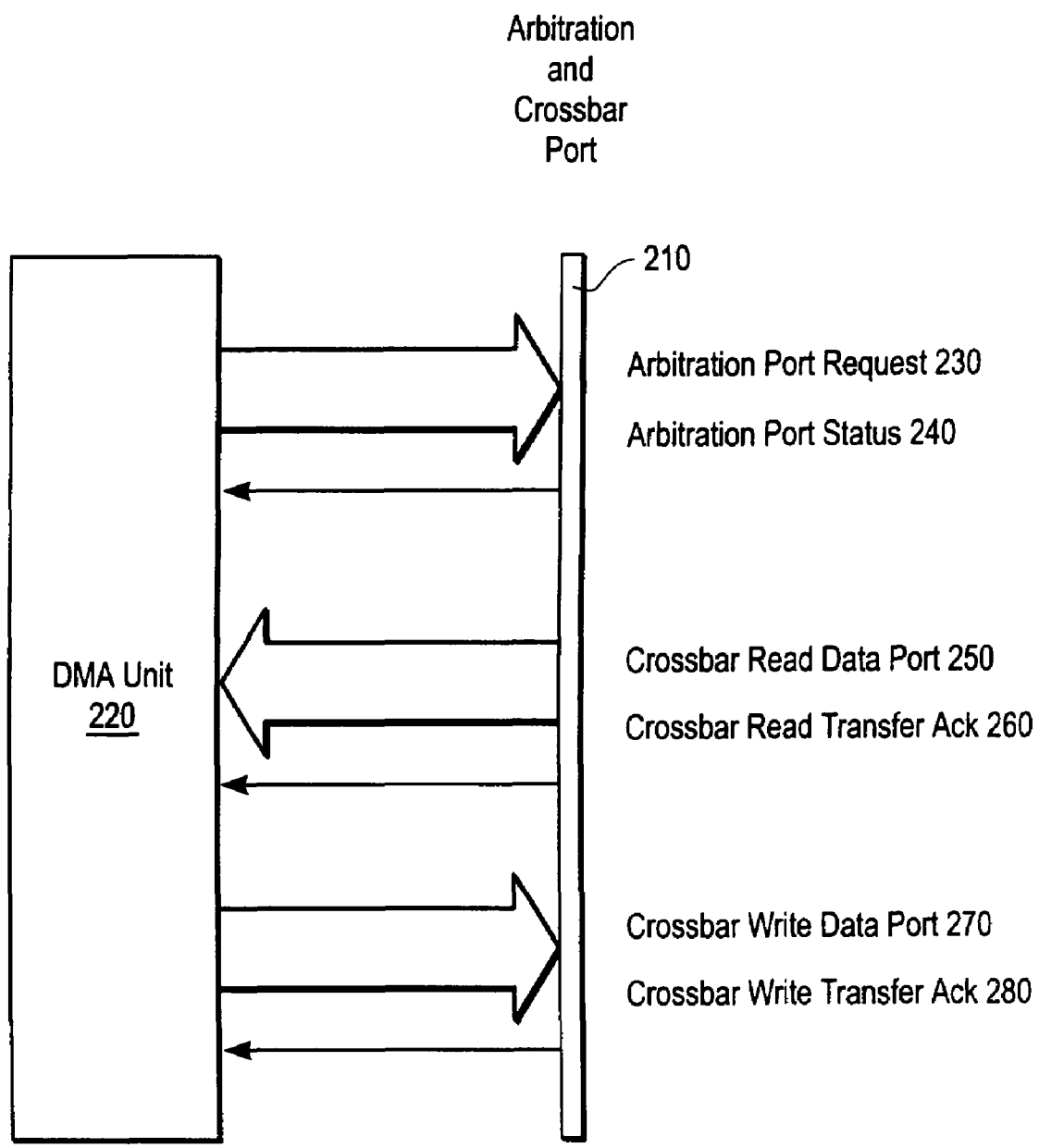
FIG. 2 shows an embodiment of an arbitration/crossbar port.

In order to increase throughput and maintain low latency, the arbitration and data movement functions performed by crossbar 150 are separated into three distinct parts—arbitration, data write (to memory), and data read (from memory), as shown in FIG. 2. The interface to the crossbar 150 is shown as an individual arbitration and crossbar port 210 (one of seven DMA ports) in simplified form.

Although not required, the read and write data paths are preferably separated to allow simultaneous transfer of packet data between the crossbar 150 and DMA unit 220. While DMA unit 220 is not required to take advantage of this feature, it is useful in maintaining high data throughput and reducing internal buffering requirements.

In one embodiment, the arbitration unit 154 operates in parallel with actual data transfers, thereby implementing a split transaction system. Thus, new arbitration requests can be issued while data transfers are in progress. Unlike systems that grant use of the bus to a requestor for an indefinite period of time, in one embodiment, the arbitration unit 154 only allows a user to occupy the data transfer bus for exactly the time required to make the necessary data transfer. This means any unit requesting a data transfer must be ready to transfer the data when requested (for write operations to memory) or receive the data (for read operations from memory) at full bus speed. This split transaction implementation improves overall throughput by overlapping or hiding the arbitration time with data transfers of previous memory requests. In one embodiment, each request to arbitration unit 154 comprises the following information: memory address, transaction type (read or write), transaction size, and request ID (optional).

Arbitration Overview

Arbitration unit 154 employs an arbitration algorithm that, in conjunction with, write and read data crossbars 156 and 158, is designed to balance the need for performance, bandwidth, and low latency. In one embodiment, the arbitration algorithm is a programmable priority scheme built on top of a fixed priority request scheme. The fixed priority request scheme may be a round robin scheme that operates on the principle of rotating top priority among the various requesters, attempting to give each device equal access to a shared resource (e.g., bus memory). In one embodiment, the fixed priority scheme is programmable and can change dynamically based on actual traffic statistics. The programmable aspect eschews fairness for a scheme that prioritizes access based on "need" with the option to give any device a higher arbitration priority. Alternatively, a non-fixed priority request scheme may be used. For example, the priority may be programmed for each slot to be fixed or non-fixed.

The arbitration sequence is divided into a sequence of a number of rotating slots. In one embodiment, the number of slots is 16; however, any number of rotating slots may be used. Embedded software being executed in crossbar 150 programs each slot independently to give priority to any one of a number of different (requesting) logic units. In one embodiment, the number of requesting units is seven; however, any number of requesting units may be used. The different requesting data transfer units may include, for example, CPU 110, Ethernet 1 (Network attach) 160, 1394 Link 164, Ethernet 2 (Switched port) 162, USB (Host) 166, USB (Slave) 168, and Expansion Port (e.g., PCI Port 140).

The arbitration algorithm allows any requesting unit to be the highest priority device during a particular arbitration slot. If the unit designated for that slot makes a request, then it is guaranteed access over the other requests if the memory resource requested is available. If there is no request from the designated device or its requested resource is not available, then the arbitration unit may award bus access to one of the other requesting units. To ensure priority, in the event the designated device cannot obtain access to the desired memory due to resource restrictions, the algorithm freezes the priority until the designated resource becomes available. This feature is known as camping and is designed to prevent starvation cases from developing.

The flow of one embodiment of the arbitration algorithm is as follows:

1) obtain current slot's "top priority" choice
2) check all incoming requests:
   a) If the "top priority" unit is requesting the bus and the desired resource is available, then arbitration unit 154 grants access to this unit and increments the slot count to point to the next slot (of the rotating slots). Thereafter, arbitration unit 154 returns to step (1).
   b) If the "top priority" unit is making a request and the desired resource is not available, arbitration unit 154 does not advance the slot count and holds at the current slot until the resource is available. If another device is requesting another available resource, then arbitration unit 154 grants that device a bus arbitration success, so that the device can access the other resource. However, arbitration unit 154 holds at the current slot position until the "top priority" requestor is serviced.
   c) If the "top priority" unit is not generating a request, then arbitration unit 154 checks all other requestors. In one embodiment, a fixed priority scheme is used for all remaining requestors. In one embodiment, the priority order is as follows: Ethernet1 160, 1394 164, Ethernet2 162, USB1 166, USB2 168, Expansion Port (e.g., PCI port 140). Arbitration unit 154 grants arbitration access to any requestor (in priority order) if the desired resource is available and increments the slot count to the next slot. Thereafter, arbitration unit 154 returns to step (1).
3) If no requests are pending, arbitration unit 154 stays at the current slot and then returns to step 1.

In one embodiment, the arbitration algorithm is designed to work every clock cycle. However, if no requests are pending, then the arbitration slot remains at the current slot number. The arbitration slot changes only when successful arbitration takes place. However, if the top priority unit is stalled due to lack of memory resource, the arbitration slot will not advance (even if a lower priority unit was allowed to proceed). After cycling through the 16 arbitration slots, the counter loops back to start the cycle all over again.

The programmable priority may be set via a pair of 32-bit registers. The registers are divided up into sixteen 3-bit groupings. Embedded software being executed by arbitration unit 154 assigns a 3-bit ID value corresponding to the (bus requesting) unit that is going to have priority for that arbitration slot. As noted above, the arbitration algorithm for any devices requesting the bus other than the top priority device is a fixed priority decode based on a priority order. The embedded software being run by arbitration unit 154 can dynamically adjust this (indirectly) by changing how many slots a particular device gets as the top priority.

Arbitration unit 154 allows a distinct bias in handling requests based on traffic analysis provided by arbitration statistics logic. In one embodiment, the arbitration unit 154 allocates slots based on bandwidth requirements as well as latency requirements. For example, CPU 110 makes many requests of 8 bytes or less (>50% of all requests to memory, especially the internal SRAM 126). These requests take one-quarter or less of the bandwidth used by the 1394/Ethernet/USB controllers (which make predominantly 32-byte transfer requests). Hence, it may make sense to provide CPU 110 with many slots to allow reduced, or even minimal, latency accesses of short duration versus the much longer duration controller accesses. "Duration" in this case refers to the amount of time a particular resource is tied up with a data transfer.

Figure 3:
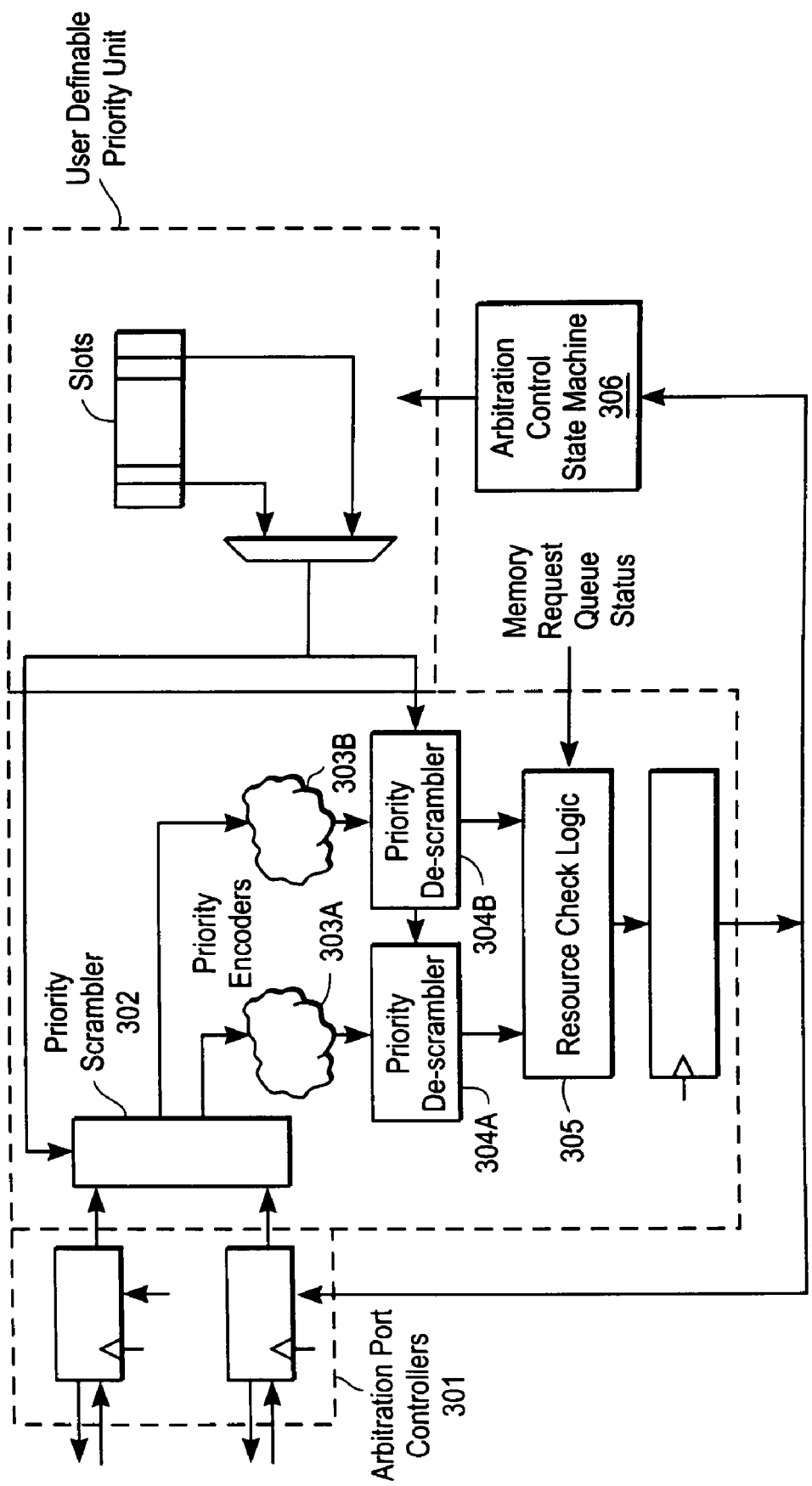
FIG. 3 shows an embodiment of the programmable arbitration architecture.

FIG. 3 is a block diagram of one embodiment of a programmable arbitration architecture in arbitration unit 154. The arbitration unit 154 comprises two units: DMA port request arbitration and memory transfer arbitration. The DMA port request arbitration is a seven-way request unit that allows the user to define access priorities to memory resources (e.g., SRAM 120, SDRAM 130). Successful requests are then dispatched to the desired memory unit (internal SRAM 120 or external SDRAM 130). If the transfer request is for a data write operation to memory, then write crossbar unit 156 is initiated to transfer the associated data to the memory unit as well. If the request is a read request, the memory unit processes the request and then arbitrates for access to read data crossbar 158. In one embodiment, this arbitration is memory transfer arbitration and is a round-robin based scheme that deals with read data requests on a first-come, first-serve basis. Other schemes may be used. An advantage of having a separate address and data phase in crossbar and arbitration unit 154 allows overlapped execution of the actual arbitration with the data transfers, thereby increasing, or may be even maximizing, bandwidth and throughput in the system.

Referring to FIG. 3, all requests to arbitration unit 154 arrive via a port request interface comprising arbitration port controllers 301. The requests are captured and processed by a programmable priority encoder. Initially, a priority scrambler 302 aligns the priority of incoming requests to match a specified "designated winner." Once this has been done, the re-prioritized requests are evaluated in two separate priority encoders 303A and 303B. Encoder 303A is responsible for accesses to SRAM 120, while encoder 303B handles accesses to SDRAM memory 130. Once a winner (if any) is determined, the results are realigned with the original port alignment using priority de-scramblers 304A and 304B. The outputs of priority descramblers 304A and 304B indicate which port, through their hard-wired interfaces, is the winner. This information is then checked with resource availability using resource checking logic 305. In one embodiment, resource checking logic 305 checks for write buffer space and space in the address queues of controllers for both SDRAM memory 130 and SRAM memory 120. To avoid long latencies, the queues in both memory controllers are kept to a relatively small depth (e.g., set at three, two of which are visible).

Based on the arbitration process, control signals are sent to arbitration control state machine 306 in arbitration unit 154, which either holds or advances to the next arbitration slot, and to arbitration port controllers 301 to indicate the results of the arbitration process to requesting devices. In one embodiment, up to two requests per cycle can be dispatched, one to SDRAM 130 and another to SRAM 120. If they are write requests, then the associated write data is processed independently by write crossbar unit 156.

In order to support choosing the correct values for the programmable priority scheme, crossbar 150 provides operational statistics on the actual utilization of the crossbar bandwidth. In one embodiment, seven registers are provided that keeps track of how many words of data are moved through crossbar 150. These registers are referred to herein as statistics registers and are part of the control and statistics register 152. In other words, these registers count the number of data transfers (words) sent through crossbar 150. These registers may maintain statistics on the average or maximum size of each request, the total number of packets, etc. In one embodiment, each statistics register is assigned to one of the active DMA ports requesting data bandwidth.

Arbitration unit 154 includes a mechanism to analyze the stored statistics to balance access based on a predefined set of rules. This mechanism may be a hardware engine or a CPU executing software. In one embodiment, this mechanism uses the statistic information to dynamically adjust the priority scheme based on bandwidth demand requirements by the various data users. In one embodiment, the registers are 32-bit registers with increment logic that allows tracking of each word through crossbar 150, and every data read or write acknowledge signal to a particular port causes the appropriate port statistics register to be incremented. In this way, only actual data transfers are used to modify the priority scheme. At the end of a time period (not to exceed 1 second in one embodiment), control software reads these registers and determines (based on, for example, the integer 32-bit values contained in the registers) which devices are using the bus most often. (The time period may be a function of the size of the statistic registers and the amount of data that is transferred through the crossbar.) The control software dynamically adjusts the arbitration slots to accommodate actual bus utilization. After processing the data values in these registers, CPU 110 clears them via slave writes to reset them for the next time interval.

Figure 4:
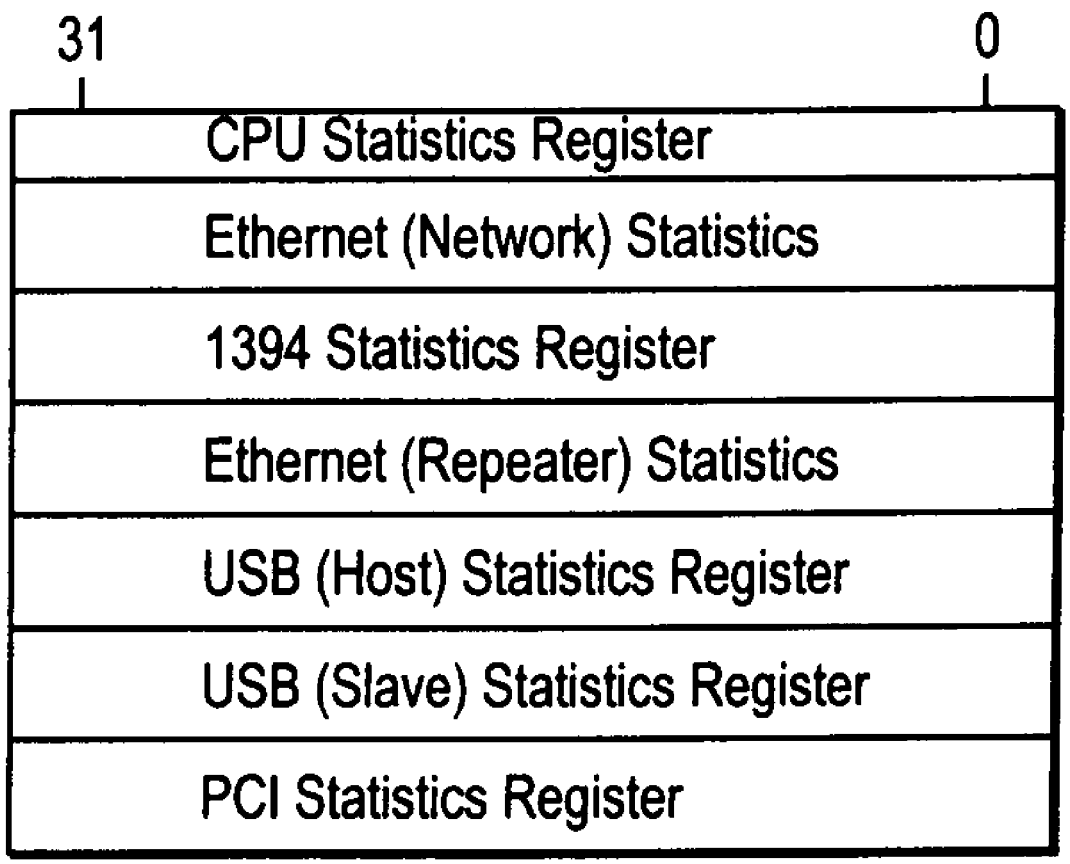
FIG. 4 shows an embodiment of a statistics register.

The statistics registers as shown in FIG. 4 store the data bandwidth used by a particular bus master over a relatively large time interval. However, in alternative embodiments, they may record information about peak demand spikes within a time period, simultaneous requests among competing bus masters, the size of transfers, latency, or even which memory (SRAM or DRAM) is being used.

Crossbar 150 may use several additional registers implemented as part of the logic. Specifically there are two 32-bit registers for controlling and specifying the 16 arbitration slots. In addition, in one embodiment, there is an SDRAM and flash memory address limit register for checking on requests to these memories. Finally, there are a group of seven statistics registers that keep track of the crossbar utilization by the various DMA masters.

Registers are used control the access priorities as well as bandwidth/latency within crossbar 150. In one embodiment, there are two 32-bit registers associated with the crossbar 150 that are shown in FIGS. 5 and 6.

Figure 5:
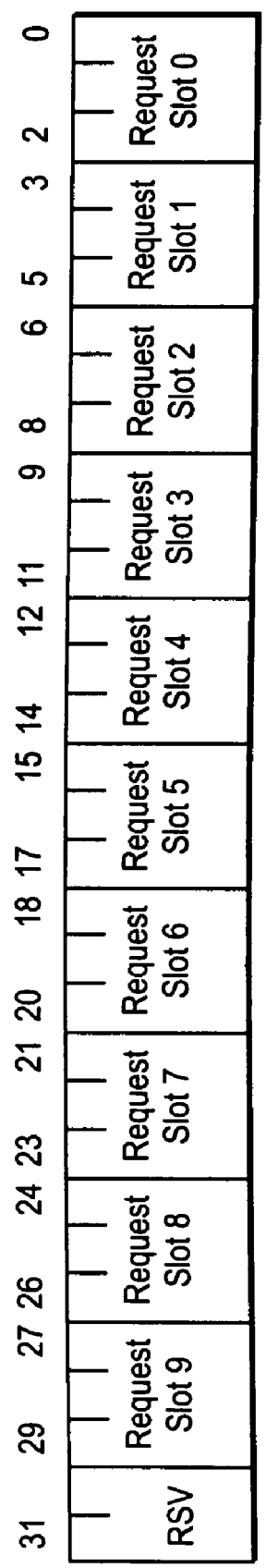
FIGS. 5 and 6 show embodiments of the arbitration configuration.

FIG. 5 comprises request slot assignment fields. These three bit fields allow the embedded software in crossbar 150 to decide which DMA/CPU device is afforded arbitration priority. In one embodiment, the hardware ID of the different arbitration capable devices is as follows: CPU, 000; Ethernet (Network), 001; Ethernet (Repeater), 010; 1394 Link, 011; USB (Host), 100; USB (Slave), 101; Expansion Port, 110. The value 111 is reserved and is not used. Other encoding schemes may be used.

Figure 6:
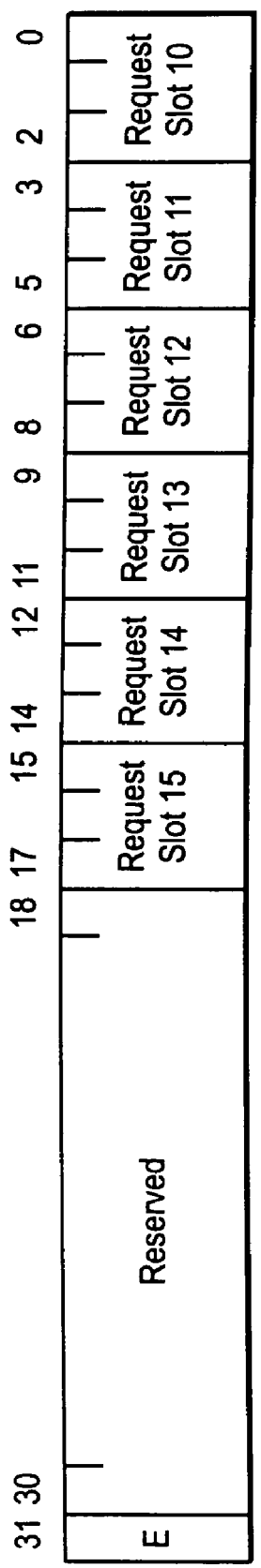

FIG. 6 comprises the six additional priority slots. One additional field exists in this register for controlling crossbar 150. Bit 31 is the arbitration enable control. When set to a zero, only CPU 110 can access memory. When set to a one, the sixteen-slot arbitration sequence is enabled for normal operation. The transition from zero to one in this bit resets the arbitration slot sequence to zero. Both of these registers are initialized to all zeros on power up and/or reset.

Figure 7:
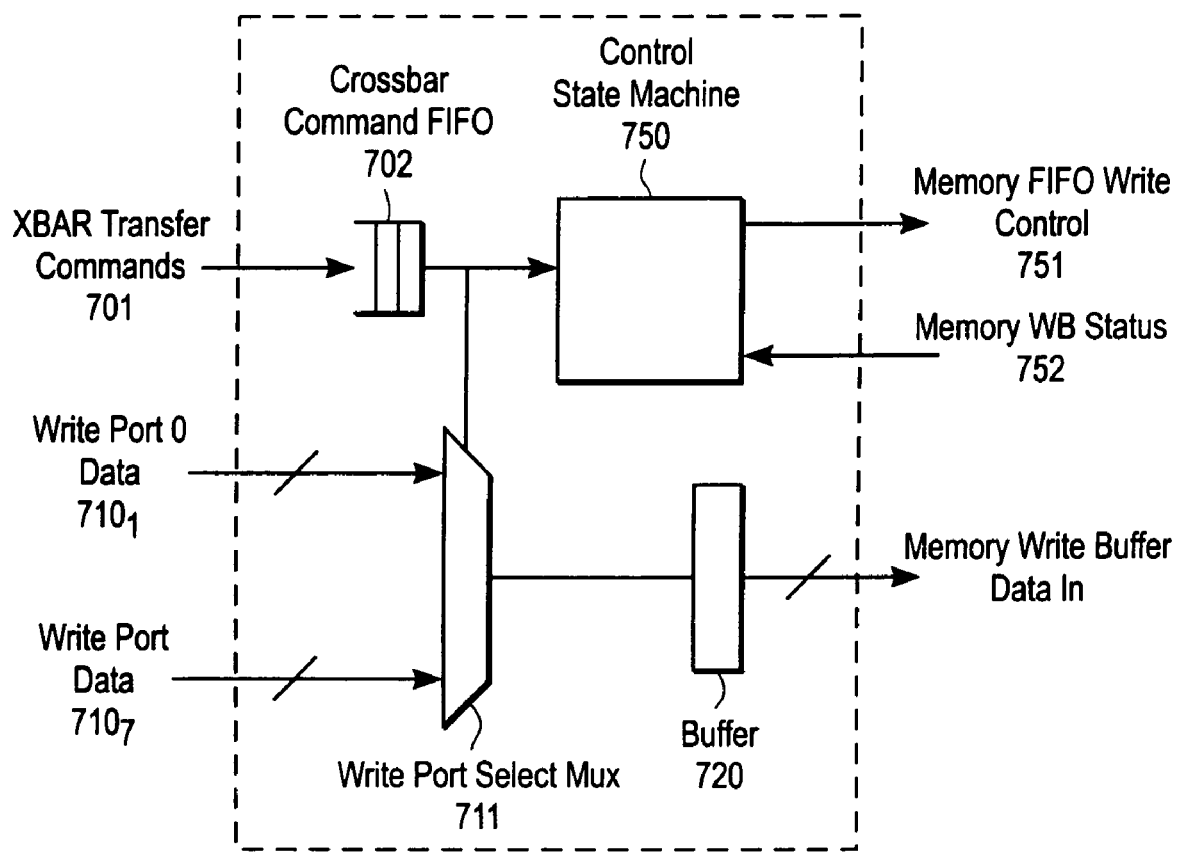
FIG. 7 shows an embodiment of a memory limit register.

FIG. 7 is a block diagram of one embodiment of a write data crossbar data architecture. The crossbar data transfer units (read or write) are nominally independent of the actual arbitration process. In one embodiment, the write crossbar (to memory) unit receives up to eight 32-bit data paths (write port 0 data 740 to write port 7 data 717) and directs them via write port select multiplexer (MUX) 711 to either the SRAM 120 controller or the external memory (SDRAM 130) controller in response to commands from crossbar command FIFO 702. The data may be buffered in write data crossbar 156 (e.g., buffer 720). Control state machine 750 acts upon the commands from command FIFO 702 to generate memory write control signals and receives status signals 752 as well. Since the crossbar operation can take multiple clocks to complete, commands 401 are placed in a queue, referred to as the crossbar command FIFO 702, to allow arbitration unit 154 to overlap the next data access arbitration with current data transfers. A limited queue depth ensures that the whole system doesn't get too far ahead of itself (which keeps latency low). The structure of FIG. 7 may be replicated for SDRAM 130 and SRAM 120. These separate data transfer functions for each of the memories allow both memories to operate in parallel for data write operations.

Arbitration Sequences

Figure 8:
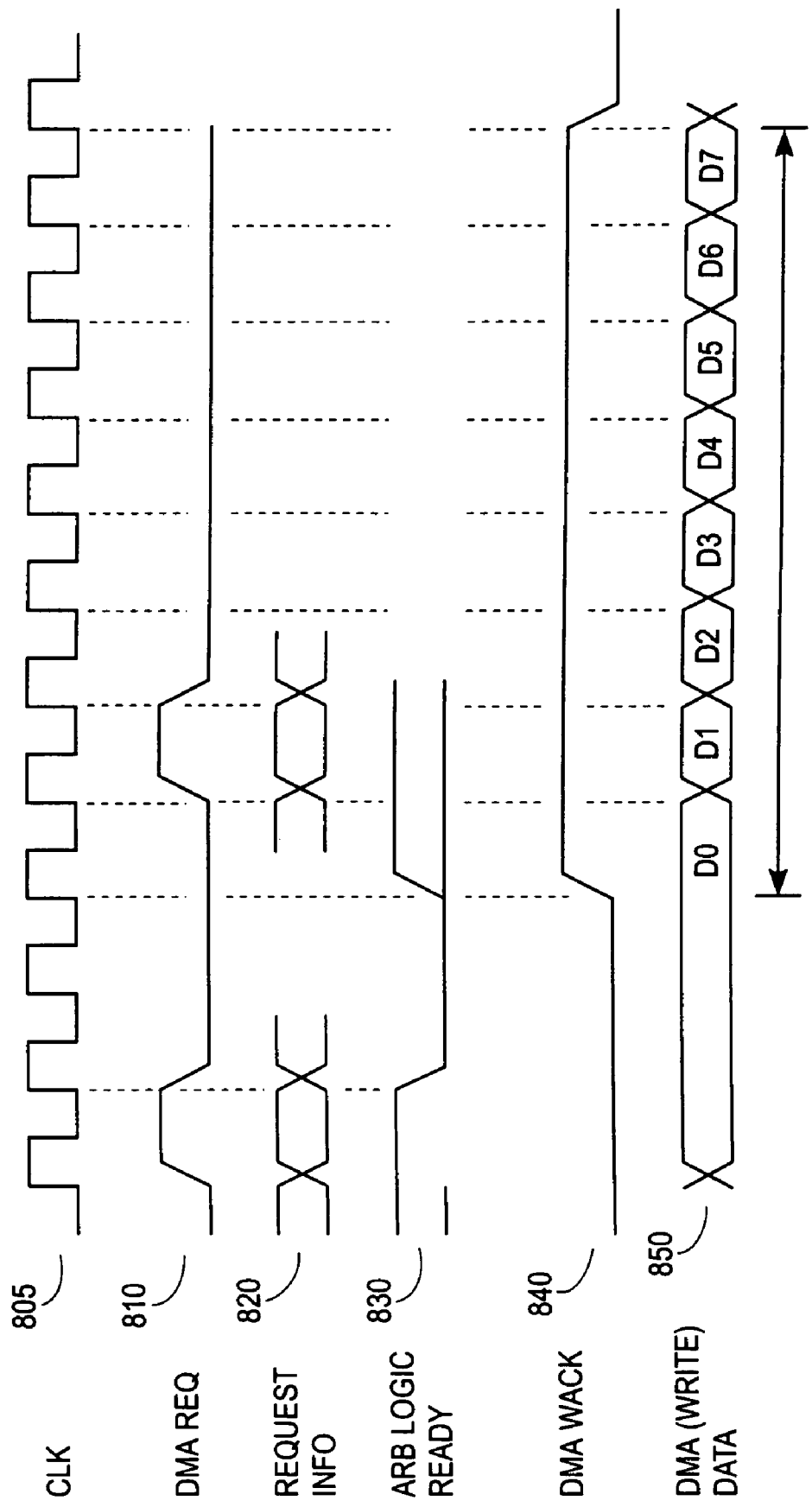
FIG. 8 shows an embodiment of the arbitration sequence for the DMA write case.

Prior to a transfer request, the requesting unit has either the data ready to transmit on the bus (write case—data ready in a write buffer) or are ready to receive the entire requested data block (read case—data space open in a read buffer). An example of a 32-byte block write on the internal 32-bit wide bus in one embodiment of the crossbar is shown in FIG. 8. In this example, the DMA issues a request 810 when it has a block of data to transfer (write case) 850 to memory. A request 810 is only asserted for a single clock 805. Requests 810 can be issued any time the central arbiter's port status signal (ARB_RDY) 830 is asserted. This signal 830 indicates that crossbar 150 is ready to accept a new request from this particular DMA unit 220 (FIG. 2). Each unit 220 has a dedicated port to crossbar 150 that is completely independent of every other port. Hence, all port signals are unique to a particular DMA unit.

Control/data/status signals to crossbar 150 are registered outputs. This includes request signals, address, size, transaction type, (optional) transaction ID, and write data. Similarly, inputs to a particular port (status, read data) are registered outputs from crossbar 150.

After issuing a new transfer request 810, there is a delay before issuing an acknowledge status. The arbitration ready status (ARB_RDY) 830 goes inactive immediately upon the receipt of a new arbitration request and becomes active again once the current request has been processed and forwarded to the appropriate memory and the data crossbar processing logic. Because the address processing is handled separately from the data transfer, there may be arbitrary delays before the data portion of a packet request is handled.

Transfer of data to the data crossbar commences immediately upon arrival of the write acknowledge signal (XPi_WACK) 840. This signal is asserted once per data word transferred where the size of the data corresponds to the size in bits of the original DMA request. The data should be generated in sequential write address order at a rate of one word per clock in direct response to the crossbar write acknowledge signal. There is no address associated with pulling the (write) data from a DMA unit. The assumption is that this is a FIFO interface mechanism. Although the XPi_WACK signal is asserted once per data word transfer, in one embodiment it is guaranteed to be asserted for consecutive clock cycles equal to the number of words in the (write) transfer packet. It is not used as a data throttle control.

FIG. 8 illustrates another important point about the arbitration process. The next DMA request (read or write) can be asserted on the next clock cycle after the arbitration port status indicates another bus request may be made. In this example, the write data is still being transferred. However, there is nothing to stop a read or write request from proceeding. For a second write request, the data component is stacked up behind the current write data transfer and handled in FIFO order. For a read request, the processing is independent at the request level while the read data is returned over the separate read data bus.

Figure 9:
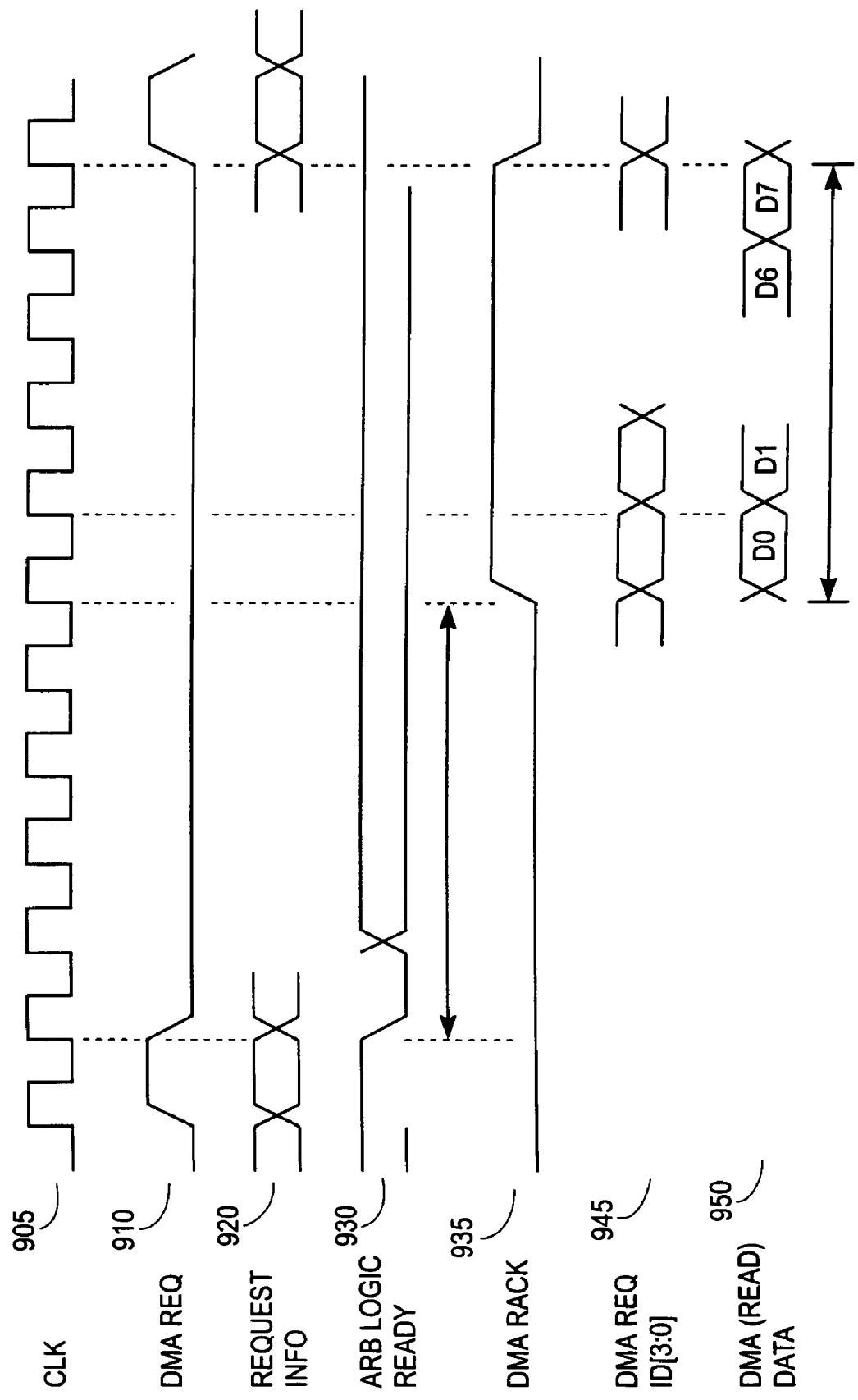
FIG. 9 shows an embodiment of the arbitration sequence for the DMA read case.

FIG. 9 shows an example of the read request and associated data transfer. In the case of a DMA read, the request is issued like the write example. However, the small delay associated with the data is dictated by the access path to the memory (SRAM 120 or SDRAM 130). In one embodiment, this delay is at least 3 clocks. In the read case, because the arbitration logic supports multiple outstanding requests from a signal DMA unit and the responses may come back out of order, a request ID tag 945 is associated with each request. Essentially, each channel of a DMA uses a unique ID value to identify each read request. Because requests may be split among different memory units with different latencies, it is possible to have data be returned "out of request order."

The separate read data bus provides the data path back to the DMA unit. A separate read data transfer strobe (XPi_RACK) 935 provides status of when new data is arriving on the bus. Like the DMA write transfer acknowledge strobe (XPi_WACK) 840, this strobe signal 935 is asserted once per data word returned as part of a DMA read packet and is asserted continuously for the duration of the data transfer starting with the first word of the transfer. Each DMA read transfer has transfer packet ID information (XPi_DID[3:0]) 945. This is an ID value that was sent with the original arbitration request 910. This optional field provides the DMA unit with a way of identifying the incoming read data in cases where multiple outstanding read requests are supported. Because of the different latencies involved in reading from SRAM and SDRAM, there is no guarantee of read request ordering for requests in cases of multiple read requests to different memories. Each data word in a packet transfer has the associated packet ID value asserted. This allows this signal to directly control internal data path in the DMA logic to steer the data correctly.

Overview of the Port Interface

Figure 10:
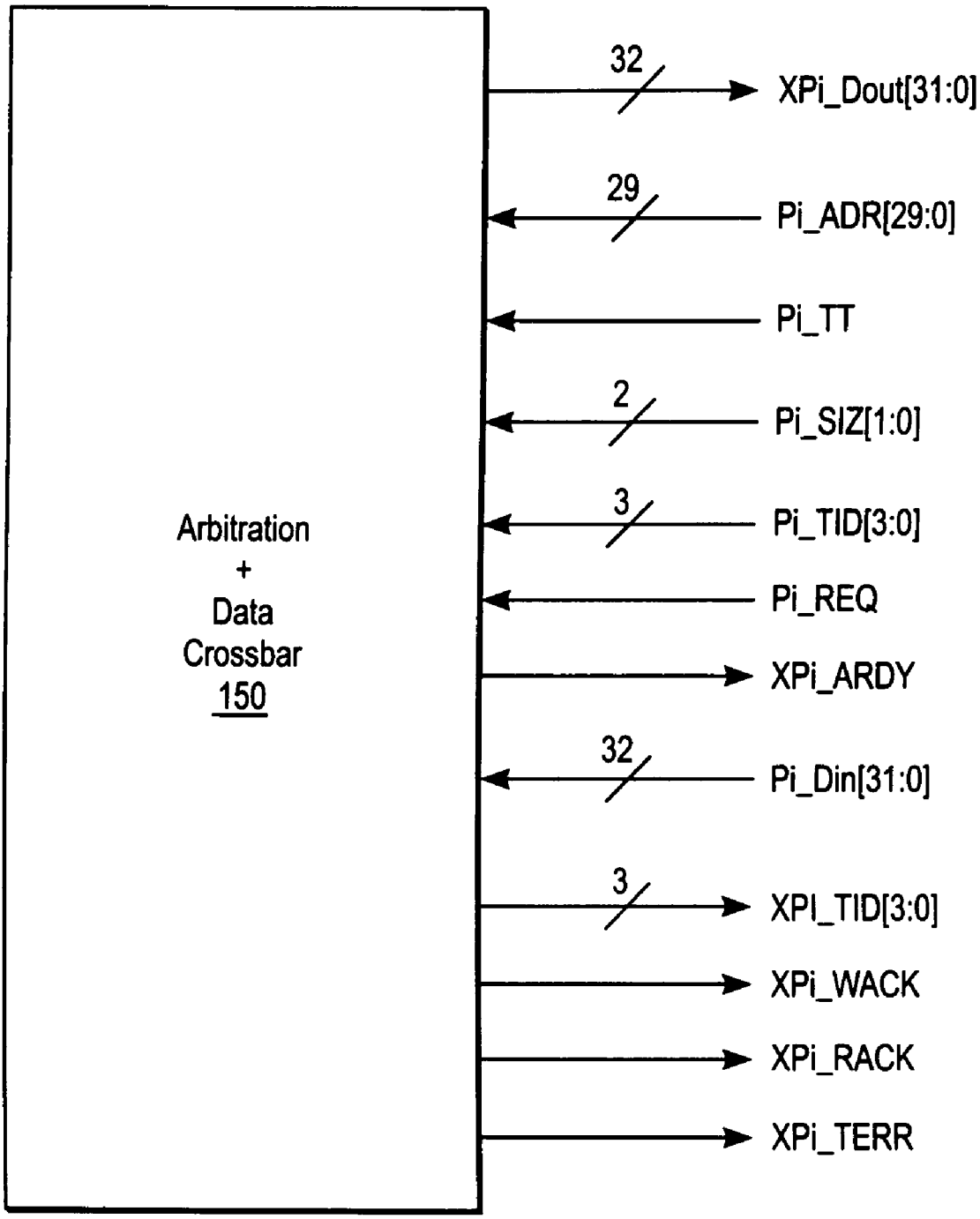
FIG. 10 shows an embodiment of a port interface to the arbitration/data crossbar.

FIG. 10 shows one embodiment of the port interface to the arbitration and data crossbar. Each unit capable of initiating requests to memory has a special interface to crossbar 150. The basic interface is described from the crossbar's perspective. This reference point of view is important since it determines the terminology for deciding what a write or read operation is in terms of transfer direction. Only one port is shown; however, there may be several different ports attached to the crossbar. The seven different ports may be: SDRAM/Flash/Expansion Port, Internal SRAM Memory, CPU, Ethernet (Network), Ethernet (Repeater), 1394 Link, USB-Host, USB-Slave.

Transactions are directed to the appropriate memory based on the address value in the transaction request. In one embodiment, DMA and CPU devices may not transfer data directly between different devices and transfers go through memory. Each of the possible DMA/CPU devices may be assigned a hardwired slot address. This information determines the source of transfer requests when returning data back to the requesting port for memory read operations. Hence the signal ports from the crossbar are differentiated by the port index, e.g. $P0\_D_{out}[31:0]$ versus $P1\_D_{out}[31:0]$ etc.

One embodiment of a signal list in Table 1 describes the transaction port associated with each DMA/CPU unit attached to the crossbar. Since there are multiple DMA units out there, the designation of Pi in front of every signal name refers to "Port i" where i is actual port number. This number is arbitrary and is assigned using the following table: CPU—Port 0, Ethernet (Network)—Port 1, Ethernet (Repeater)—Port 2, 1394 Link—Port 3, USB (Host)—Port 4, USB (Slave)—Port 5, PCI—Port 6.

TABLE 1

| Signal Name | Type | Description |
| --- | --- | --- |
| Pi_DIN[31:0] | Input | DMA write transactions to memory are transferred on this data bus. This input-only bus contains valid data only when the arbitration unit in the crossbar acknowledges the (DMA write) transfer request (and the 1, 2, 4, or 8 subsequent clocks cycles). |
| Pi_ADR[28:0] | Input | These are the memory address value for the requested data transfer. These bits are only considered valid when the Pi_REQ is asserted, i.e., a transfer request is being made. Since all transfers through the crossbar are word aligned, the least significant two bits of this address bus are zero. |
| Pi_SIZ[1:0] | Input | These are the transfer size of the current requested transaction. Valid only when Pi_REQ is asserted these bits are decoded by the crossbar to represent the following transfer sizes:<br>00 = 1 word<br>01 = 2 words<br>10 = 4 words<br>11 = 8 words |
| Pi_TT | Input | This bit indicates the type of transfer. A value of zero (0) indicates a data write to the crossbar while a value of one (1) indicates a data read from memory (via the crossbar). This bit is only considered valid when the Pi_REQ is asserted, i.e., a transfer request is being made. |
| Pi_TID[3:0] | Input | Transaction ID. This optional identifier uniquely identifies the current read request. These bits are used when a particular port has multiple independent request channels that are capable of supporting multiple outstanding read requests. Since outstanding (read) requests may finish out of request order, these bits form an address tag that will be provided back to the requesting unit with the data when it arrives back at the DMA/CPU unit. |
| Pi_REQ | Input | This is the transaction request signal from the DMA/CPU unit attached to this particular crossbar port. This signal is asserted for one clock cycle per transfer request (a request being a single packet of 1, 2, 4, or 8 words). It is asserted only when the arbitration unit for the port indicates it can accept new requests. The associated parameters of the request (size, direction, and address) must be valid in the same clock cycle as this request. |
| Pi_ARDY | Output | Port Arbiter Ready. This signal indicates that the port is ready to accept a new arbitration request. Arbitration requests must not be asserted unless this signal is active. |

TABLE 1-continued

| Signal Name | Type | Description |
|---|---|---|
| XPi_TERR | Output | Transaction Error. This signal acknowledges a transaction as complete, but with no data transferred. It signals that a request was made that violated the available address map supported by the crossbar. The requesting unit should interrupt the embedded CPU to handle this problem. |
| XPi_RACK | Output | Crossbar Read (Data) Acknowledge. This signal is asserted to signify the start of data transfer from the crossbar to the port. It is asserted once per data word transferred. The data will appear coincident with each clock cycle that this signal is asserted. |
| XPi_WACK | Output | Crossbar Write (Data) Acknowledge. This signal is asserted to signify the start of data transfer to the crossbar. It is asserted once per data word transferred. The next word of data must appear one clock after the clock when this signal was asserted. |
| XPi_TID[3:0] | Output | Transaction (Data) ID. These signals indicate the unique ID for the read transfer (to) the DMA/CPU. These bits are used only in cases where outstanding read requests coming back out of order necessitate some form of unique identifier. They are valid only when the XPi_RACK status signal is asserted. |
| XPi_DOUT[31:0] | Output | Data Out. This is the data bus to the DMA/CPU unit for transferring data from memory. Data is valid only when the XPi_WACK signal is asserted during read transfers. This can be for 1, 2, 4 or 8 consecutive clocks. In theory, back to back read packets may arrive. |

In one embodiment, all control signals (address, size, type, request) to the crossbar and arbitration unit are registered for timing reasons to ensure the arbitration algorithms have sufficient time to process the arbitration request in a single clock.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. An apparatus comprising:
   a memory;
   a plurality of functional units that transfer data to and from the memory;
   a crossbar that provides a data path from each unit to the memory, wherein the crossbar comprises an arbitration unit to monitor data traffic generated by each of the plurality of functional units through the crossbar and assigns a priority to each functional unit based on the data traffic, wherein one of the plurality of functional units comprises another crossbar,
   wherein the arbitration unit monitors data traffic from each functional unit by monitoring a type of data that each functional unit transfers.

2. The apparatus defined in claim 1, wherein the arbitration unit monitors data traffic from each functional unit by monitoring how often each functional unit transfers data through the crossbar.

3. The apparatus defined in claim 1, wherein the arbitration unit uses a programmable priority scheme and a fixed priority scheme.

4. The apparatus defined in claim 3 wherein the fixed priority scheme comprises a round robin scheme that rotates the top priority designation among at least some of the plurality of units.

5. The apparatus defined in claim 3 wherein the programmable priority scheme makes changes based on actual traffic statistics.

6. The apparatus defined in claim 3 wherein the arbitration unit uses a number of rotating slots, each programmed to assign priority to any one of the plurality of functional units.

7. The apparatus defined in claim 6 wherein the arbitration unit grants access to one functional unit if the one functional unit makes a request while the arbitration unit indicates that the one functional unit is at one of the number of rotating slots having a highest priority.

8. The apparatus defined in claim 1 further comprising:
   a central processing unit (CPU); and
   an access bus coupled to the CPU and plurality of functional units, the access bus being independent of the data path.

9. The apparatus defined in claim 1 wherein the arbitration unit further comprises a direct memory access (DMA) port request unit that allows access priorities to the memory to be programmably defined.

10. The apparatus defined in claim 1 wherein the arbitration unit further comprises statistics registers that indicate usage of the data paths.

11. The apparatus defined in claim 10 wherein the statistics registers store a count of the number of data transfers through the crossbar.

12. The apparatus defined in claim 10 wherein the arbitration unit dynamically adjusts the priority assigned to each functional unit based on bandwidth demand requests by each functional unit.

13. The apparatus defined in claim 10 wherein the arbitration unit dynamically adjusts the priority assigned to each functional unit based on delays in getting requests serviced.

14. An apparatus comprising:
   a memory;
   a plurality of functional units that transfer data to and from the memory;
   a crossbar that provides a data path from each unit to the memory, wherein the crossbar comprises an arbitration unit to monitor data traffic generated by each of the plurality of functional units through the crossbar and assigns a priority to each functional unit based on the data traffic,
   wherein the arbitration unit monitors data traffic from each functional unit by monitoring the type of data that each functional unit transfers, wherein the arbitration unit uses a programmable priority scheme and a fixed priority scheme, wherein the arbitration unit uses a number of rotating slots, each programmed to assign priority to any one of the plurality of functional units, wherein the arbitration unit grants access to one functional unit if the one functional unit makes a request while the arbitration unit indicates that the one functional unit is at one of the number of rotating slots having a highest priority, and wherein the arbitration unit only grants access if all necessary resources requested by the one functional unit are available.

15. An apparatus comprising:

a memory;

a plurality of functional units that transfer data to and from the memory;

a crossbar that provides a data path from each unit to the memory, wherein the crossbar comprises an arbitration unit to monitor data traffic generated by each of the plurality of functional units through the crossbar and assigns a priority to each functional unit based on the data traffic, wherein the arbitration unit monitors data traffic from each functional unit by monitoring the type of data that each functional unit transfers, wherein the arbitration unit uses a programmable priority scheme and a fixed priority scheme, wherein the arbitration unit uses a number of rotating slots, each programmed to assign priority to any one of the plurality of functional units, wherein the arbitration unit grants access to one functional unit if the one functional unit makes a request while the arbitration unit indicates that the one functional unit is at one of the number of rotating slots having a highest priority, and wherein the arbitration unit increments a slot count to change the highest priority to another of the rotating slots after granting access to the one functional unit.

16. An apparatus comprising:

a memory;

a plurality of functional units that transfer data to and from the memory;

a crossbar that provides a data path from each unit to the memory, wherein the crossbar comprises an arbitration unit to monitor data traffic generated by each of the plurality of functional units through the crossbar and assigns a priority to each functional unit based on the data traffic, wherein the arbitration unit monitors data traffic from each functional unit by monitoring the type of data that each functional unit transfers, wherein the arbitration unit uses a programmable priority scheme and a fixed priority scheme, wherein the arbitration unit uses a number of rotating slots, each programmed to assign priority to any one of the plurality of functional units, wherein the arbitration unit grants access to one functional unit if the one functional unit makes a request while the arbitration unit indicates that the one functional unit is at one of the number of rotating slots having a highest priority, and wherein the arbitration unit uses the fixed priority scheme to grant access to one of the plurality of functional units when the one functional unit makes a request, is not assigned to a slot with the highest priority, and a functional unit with the highest priority is not making a request or a desired resource of the functional unit with the highest priority is not available.

* * * * *